US007803509B2

United States Patent
Moriyama et al.

(10) Patent No.: US 7,803,509 B2
(45) Date of Patent: Sep. 28, 2010

(54) CRYSTALLINE POLYESTER FOR TONER

(75) Inventors: Shinji Moriyama, Wakayama (JP);
Takashi Kubo, Wakayama (JP);
Yoshihiro Fukushima, Wakayama (JP)

(73) Assignee: Kao Corporation, Tokyo (JP)

( * ) Notice: Subject to any disclaimer, the term of this patent is extended or adjusted under 35 U.S.C. 154(b) by 812 days.

(21) Appl. No.: 11/182,878

(22) Filed: Jul. 18, 2005

(65) Prior Publication Data

US 2006/0057486 A1    Mar. 16, 2006

(30) Foreign Application Priority Data

Sep. 15, 2004   (JP)   ............... 2004-268684
Dec. 9, 2004    (JP)   ............... 2004-357257

(51) Int. Cl.
*G03G 9/087*   (2006.01)
(52) U.S. Cl. ................ 430/109.4; 430/108.7
(58) Field of Classification Search .......... 430/109.4, 430/108.7
See application file for complete search history.

(56) References Cited

U.S. PATENT DOCUMENTS

| 6,383,705 B2 | 5/2002 | Aoki et al. |
| 6,677,096 B2 | 1/2004 | Tachi et al. |
| 2001/0018157 A1 | 8/2001 | Aoki et al. |
| 2002/0150830 A1 * | 10/2002 | Katagiri et al. ........ 430/108.24 |
| 2003/0096184 A1 * | 5/2003 | Kawaji et al. ............ 430/109.3 |
| 2003/0165759 A1 * | 9/2003 | Suzuki et al. ............ 430/108.4 |
| 2004/0023141 A1 * | 2/2004 | Shirai et al. .............. 430/109.3 |
| 2004/0137351 A1 * | 7/2004 | Sato ........................ 430/108.8 |
| 2004/0137354 A1 * | 7/2004 | Yamazaki et al. ........ 430/109.4 |
| 2004/0152003 A1 * | 8/2004 | Sato et al. ................ 430/108.4 |
| 2004/0152005 A1 | 8/2004 | Ito et al. |

FOREIGN PATENT DOCUMENTS

| JP | 2001-222138 | 8/2001 |
| JP | 2003-248340 | 9/2003 |
| JP | 2003-302786 | 10/2003 |
| JP | 2004-61875 | 2/2004 |
| JP | 2004-226847 | 8/2004 |
| WO | WO 03/001302 A1 | 1/2003 |

* cited by examiner

*Primary Examiner*—Mark F Huff
*Assistant Examiner*—Rachel L Burney
(74) *Attorney, Agent, or Firm*—Oblon, Spivak, McClelland, Maier & Neustadt, L.L.P.

(57) ABSTRACT

The present invention relates to a crystalline polyester for toner, obtained by a process comprising the step of polymerizing raw material monomers in the presence of a wax, wherein the crystalline polyester has a number-average molecular weight of from 3000 to 10000 and a weight-average molecular weight of from 150000 to 8000000. The toner containing the crystalline polyester of the present invention can be used, for example, for developing electrostatic latent images formed in electrophotography, electrostatic recording method, electrostatic printing method, and the like.

21 Claims, No Drawings

CRYSTALLINE POLYESTER FOR TONER

FIELD OF THE INVENTION

The present invention relates to a crystalline polyester for toner used, for example, for developing electrostatic latent images formed in electrophotography, electrostatic recording method, electrostatic printing method and the like; and a toner containing the crystalline polyester.

BACKGROUND OF THE INVENTION

Toners containing a crystalline polyester as a resin binder have been studied for the purpose of improving low-temperature fixing ability, which is one of the major problems to be solved in electrophotography (JP 2001-222138 A). However, further improvement is still highly desired in properties which is incompatible with low-temperature fixing ability, for example, in storage property as well as durability such as prevention of toner spent to carrier in the two-component development or durability such as prevention of toner fusion onto the blade in the monocomponent development.

In order to improve the properties including durability, there is proposed a high molecular weight-type crystalline polyester having a molecular weight distribution shifted to the higher side (JP 2004-61875 A). However, when a toner containing a crystalline polyester is used for a continuous printing in a high-speed printer, especially in a high-speed printer at a linear speed exceeding 370 mm/sec, a problem of image quality deterioration called as "ghost phenomenon" is likely to arise. The "ghost phenomenon" is a phenomenon that a toner is developed even on a portion where a toner is not developed in a normal operation (non-image bearing portion) upon applying the bias voltage, by reason that the photoconductor surface becomes deteriorated during the course of a continuous printing, resulting in no surface potential on the surface.

SUMMARY OF THE INVENTION

The present invention relates to:

[1] a crystalline polyester for toner, obtained by a process comprising the step of polymerizing raw material monomers in the presence of a wax, wherein the crystalline polyester has a number-average molecular weight of from 3000 to 10000 and a weight-average molecular weight of from 150000 to 8000000; and

[2] a toner containing as a resin binder the crystalline polyester of [1] above.

DETAILED DESCRIPTION OF THE INVENTION

The present invention relates to a crystalline polyester which is excellent in low-temperature fixing ability and durability as a resin binder for toner, and which can continuously reproduce excellent toner images without image quality deterioration even when used for a continuous printing in a high-speed printer; and a toner containing the crystalline polyester.

The crystalline polyester for toner of the present invention and the toner containing the crystalline polyester are excellent in low-temperature fixing ability and durability, and exhibit an excellent effect of being able to continuously reproduce excellent toner images without image quality deterioration even when used for a continuous printing in a high-speed printer.

These and other objects of the present invention will be apparent from the following description.

The crystalline polyester for toner of the present invention is obtained by polymerizing raw material monomers in the presence of a wax. Since the crystalline polyester of the present invention has an average molecular weight adjusted within a specified range, a toner containing the crystalline polyester of the present invention as a resin binder can provide excellent fixed images without causing image quality deterioration (ghost phenomenon) even when used for a continuous printing in a high-speed printing machine.

The crystalline polyester is poor in compatibility with an amorphous polyester due to a difference in their molecular structures. Consequently, when these resins are used in combination, an islands-sea structure is formed, and additives such as a colorant and a charge control agent are likely to be aggregated in the interface between the resins. It is presumed that a toner having the non-uniformly dispersed additives therein is repeatedly developed on the surface of a photoconductor, the photoconductor surface become damaged, which may be responsible for ghost phenomenon.

However, when the crystalline polyester of the present invention is used in combination with an amorphous polyester, the formation of the islands-sea structure is suppressed, though the reason for this is unclear, and the dispersibility of additives in toner is found to be improved.

The crystalline polyester has a number-average molecular weight of from 3000 to 10000, preferably from 5000 to 9000, and more preferably from 6000 to 8000, since the storage property is adversely affected when the number-average molecular weight is too small, while the productivity is adversely affected when the number-average molecular weight is too large.

In addition, since it is preferable that the crystalline polyester contains a high-molecular weight component to some extent from the viewpoint of durability, the crystalline polyester has a weight-average molecular weight of from 150000 to 8000000, preferably from 200000 to 3000000, and more preferably from 300000 to 1000000.

In the present invention, "crystalline" means that a resin has a ratio of the softening point to the maximum peak temperature of heat of fusion (softening point/peak temperature) of from 0.6 to 1.3, preferably from 0.9 to 1.2, and more preferably more than 1.0 and 1.2 or less. Also, "amorphous" means that a resin has a ratio of the softening point to the maximum peak temperature of heat of fusion (softening point/peak temperature) is more than 1.3 and 4.0 or less, and preferably from 1.5 to 3.0.

The crystalline polyester of the present invention has a maximum peak temperature of heat of fusion of preferably from 60° to 150° C., more preferably from 80° to 140° C., and even more preferably from 100° to 130° C., from the viewpoint of fixing ability, storage property and durability.

The crystalline polyester of the present invention is preferably a resin obtained by polycondensation of an alcohol component containing 60% by mol or more of an aliphatic diol having 2 to 6 carbon atoms, and preferably 4 to 6 carbon atoms, and a carboxylic acid component containing 60% by mol or more of an aliphatic dicarboxylic acid compound having 2 to 8 carbon atoms, preferably 4 to 6 carbon atoms, and more preferably 4 carbon atoms.

The aliphatic diol having 2 to 6 carbon atoms includes ethylene glycol, 1,2-propylene glycol, 1,3-propylene glycol, 1,4-butanediol, 1,5-pentanediol, 1,6-hexanediol, neopentyl glycol, 1,4-butenediol and the like. An α,ω-linear alkane diol is more preferable.

It is desired that the aliphatic diol having 2 to 6 carbon atoms is contained in the alcohol component in an amount of preferably 60% by mol or more, more preferably from 80 to 100% by mol, and even more preferably from 90 to 100% by mol. It is more desirable that one of the aliphatic diols comprises 70% by mol or more, and preferably from 80 to 95% by mol of the alcohol component. In particular, it is desirable that 1,6-hexanediol is contained in the alcohol component in an amount of preferably 60% by mol or more, more preferably from 70 to 100% by mol, and even more preferably from 80 to 100% by mol.

The alcohol component may contain a polyhydric alcohol component other than the aliphatic diol having 2 to 6 carbon atoms. The polyhydric alcohol component includes aromatic dihydric alcohols such as an alkylene (2 or 3 carbon atoms) oxide (average number of moles: 1 to 10) adduct of bisphenol A, such as polyoxypropylene(2.2)-2,2-bis(4-hydroxyphenyl)propane and polyoxyethylene(2.2)-2,2-bis(4-hydroxyphenyl)propane; and trihydric or higher polyhydric alcohol such as glycerol, pentaerythritol, and trimethylolpropane.

The aliphatic dicarboxylic acid having 2 to 8 carbon atoms includes oxalic acid, malonic acid, maleic acid, fumaric acid, citraconic acid, itaconic acid, glutaconic acid, succinic acid and adipic acid; acid anhydrides thereof; alkyl(1 to 3 carbon atoms) esters thereof; and the like. Among them, fumaric acid and adipic acid are preferable, and fumaric acid is more preferable. Here, the aliphatic dicarboxylic acid compound refers to the above-mentioned aliphatic dicarboxylic acids, acid anhydrides thereof and alkyl(1 to 3 carbon atoms) esters thereof, among which aliphatic dicarboxylic acids are preferable.

It is desirable that the aliphatic dicarboxylic acid compound having 2 to 8 carbon atoms is contained in the carboxylic acid component in an amount of preferably 60% by mol or more, more preferably from 80 to 100% by mol, and even more preferably from 90 to 100% by mol. It is more desirable that one of the aliphatic dicarboxylic acid compounds comprises preferably 60% by mol or more, more preferably from 70 to 100% by mol, and even more preferably from 80 to 100% by mol of the carboxylic acid component. Above all, it is desirable that fumaric acid is contained in the carboxylic acid component in an amount of preferably 60% by mol or more, more preferably from 70 to 100% by mol, and even more preferably from 80 to 100% by mol.

The carboxylic acid component may contain a polycarboxylic acid compound other than the aliphatic dicarboxylic acid compound having 2 to 8 carbon atoms. The polycarboxylic acid compound includes aromatic dicarboxylic acids such as phthalic acid, isophthalic acid and terephthalic acid; aliphatic dicarboxylic acids such as sebacic acid, azelaic acid, n-dodecylsuccinic acid and n-dodecenylsuccinic acid; alicyclic dicarboxylic acids such as cyclohexanedicarboxylic acid; tricarboxylic or higher polycarboxylic acids such as trimellitic acid and pyromellitic acid; acid anhydrides thereof; alkyl(1 to 3 carbon atoms) esters thereof; and the like.

Incidentally, with respect to the molar ratio of the carboxylic acid component to the alcohol component (carboxylic acid component/alcohol component) in the crystalline polyester of the present invention, the molar ratio is preferably 0.9 or more and less than 1.0, and more preferably 0.95 or more and less than 1.0, from the viewpoint of stability during the preparation, and from the viewpoint of easily adjusting the molecular weight of the resin by distilling the alcohol component off during the reaction under vacuum when an excess of the alcohol component is used.

The wax may be any of a hydrocarbon-based wax, an ester-based wax, an amide-based wax and the like. Hydrocarbon-based waxes are preferable from the viewpoint of compatibility with the crystalline resin and releasing property. Hydrocarbon-based waxes generally have a unit represented by the formula —(CH$_2$—CH(R))n-(wherein R is hydrogen atom or a hydrocarbon group having 1 to 3 carbon atoms). Specifically, the hydrocarbon-based waxes include polyethylene waxes such as Fischer-Tropsch wax, polypropylene waxes, polyethylene-polypropylene waxes, microcrystalline wax and paraffin wax. Among them, polyethylene waxes and polypropylene waxes are preferable, and polypropylene waxes are more preferable, from the viewpoint of improving pulverizability of the crystalline resin.

The melt viscosity at 180° C. of the wax is preferably 0.03 Pa·s or more from the viewpoint of compatibility with the crystalline polyester, and preferably 0.2 Pa·s or less from the viewpoint of fixing ability. From these viewpoints, the melt viscosity at 180° C. of the wax is preferably from 0.03 to 0.2 Pa·s, more preferably from 0.04 to 0.19 Pa·s, and even more preferably from 0.05 to 0.18 Pa·s.

The content of the wax is preferably 0.1 to 20 parts by weight, more preferably 0.5 to 15 parts by weight, and even more preferably 1 to 10 parts by weight, based on 100 parts by weight of the crystalline polyester obtained according to the present invention.

The crystalline polyester of the present invention is obtained by polymerizing the raw material monomers in the presence of the wax, for example, which is added to the reaction system of the raw material monomers for the crystalline polyester.

The polymerization of the raw material monomers can be carried out by known methods in accordance with the type of the desired resin. For instance, the crystalline polyester can be prepared by condensation polymerization reaction of the alcohol component and the carboxylic acid component in an inert gas atmosphere at a temperature of 120° to 230° C., using an esterification catalyst, a polymerization inhibitor and the like as required. Specifically, in order to enhance the strength of the resin, the entire monomers may be charged at once. Alternatively, in order to reduce the low-molecular weight components, divalent monomers may be firstly reacted, and thereafter trivalent or higher polyvalent monomers may be added and reacted. In addition, the reaction may be promoted by reducing the pressure of the reaction system in the second half of the polymerization. Incidentally, when obtaining the crystalline polyester of the present invention, it is preferable to increase the molecular weight and, more preferably, the reaction is allowed to proceed until the reaction solution has a high viscosity. In order to obtain the crystalline polyesters having an increased molecular weight, the reaction conditions may be selected, for example, the molar ratio between the carboxylic acid component and the alcohol component is adjusted, as described above; the reaction temperature is raised; the amount of a catalyst is increased; and the dehydration reaction is carried out under reduced pressure for a longer time. Incidentally, although crystalline polyesters having an increased molecular weight can be obtained by using a high-power motor, when a crystalline polyester having an increased molecular weight is prepared without any particular selection of manufacturing equipment, it may be an effective means to react the raw material monomers with a non-reactive resin having a low viscosity or a non-reactive solvent.

Incidentally, the wax may be added to the raw material monomers at the beginning of the polymerization reaction, or during the polymerization reaction after the reaction is started. The wax may be added continuously or portion-wise from the beginning to the end of the polymerization reaction.

In addition, the diameter of the wax dispersed in the crystalline polyester of the present invention is preferably 5 μm or more from the viewpoint of pulverizability, and preferably 200 µm or less from the viewpoint of preventing it from being exposed on the toner surface. From these viewpoints, the diameter of the wax dispersed is preferably from 5 to 200 µm, and more preferably from 10 to 100 µm. The diameter of the wax dispersed can be adjusted by the kind of raw material monomer and wax, agitation force during the polymerization of raw materials, cooling rate after the polymerization, and the like.

Further, the present invention provides a toner containing as a resin binder the crystalline polyester as described above. The crystalline polyester of the present invention comprises preferably 1 to 40% by weight, more preferably 3 to 35% by weight, and even more preferably 5 to 30% by weight, of the resin binder. It is preferable that the toner further contains an amorphous resin as a resin binder in addition to the crystalline polyester.

The amorphous resin includes amorphous polyesters, amorphous polyester-polyamides, vinyl resins such as amorphous styrene-acrylic resins, hybrid resins containing two or more resin components, mixtures thereof, and the like. Among them, from the viewpoint of fixing ability and compatibility with the crystalline polyester, amorphous polyesters, amorphous polyester-polyamides, and hybrid resins in which an amorphous polyester component and a vinyl resin component are partially chemically bonded to each other are preferable, and amorphous polyesters are more preferable.

The amorphous polyester can be prepared in the same manner as in the crystalline polyester. Here, in order to make the polyester amorphous, it is preferable that the following requirements are met:

(1) in a case where monomers for accelerating crystallization of a resin, such as an aliphatic diol having 2 to 6 carbon atoms and an aliphatic dicarboxylic acid compound having 2 to 8 carbon atoms, are used, crystallization is suppressed by using two or more of these monomers in combination, specifically, in each of the alcohol component and the carboxylic acid component, at least one of these monomers is used in an amount of from 10 to 70% by mol, and preferably from 20 to 60% by mol of each component, and these monomers are used in two or more kinds, preferably two to four kinds; or (2) in a case where monomers for accelerating amorphousness of a resin, preferably an alkylene oxide adduct of bisphenol A as an alcohol component, or a substituted succinic acid of which substituent is an alkyl group or an alkenyl group as a carboxylic acid component is used, these monomers are used in an amount of from 30 to 100% by mol, and preferably from 50 to 100% by mol, of the alcohol component or the carboxylic acid component, preferably of the alcohol component and the carboxylic acid component, respectively.

Also, as the raw material monomers for the amorphous polyester-polyamides, in addition to the polyhydric alcohol component and the polycarboxylic acid component described above, in order to form the amide components, polyamines such as ethylenediamine, pentamethylenediamine, hexamethylenediamine, diethylenetriamine, iminobispropylamine, phenylenediamine, xylylenediamine and triethylenetetramine; aminocarboxylic acids such as 6-aminocaproic acid and ε-caprolactam; amino alcohols such as propanolamine; and the like are used. Among them, hexamethylenediamine and ε-caprolactam are preferable.

The amorphous polyester-polyamides can be prepared in the same manner as in the amorphous polyester.

In the present invention, the hybrid resin may be obtained by using two or more resins as raw materials, or it may be obtained by using one resin and raw material monomers for the other resin. Further, the hybrid resin may be obtained from a mixture of raw material monomers for two or more resins. In order to efficiently obtain a hybrid resin, those obtained from a mixture of raw material monomers for two or more resins are preferable.

Therefore, it is preferable that the hybrid resin is obtained by mixing raw material monomers for two polymerization resins each having independent reaction paths, preferably raw material monomers for a condensation polymerization resin and raw material monomers for an addition polymerization resin, and carrying out the two polymerization reactions. Specifically, the hybrid resin described in Japanese Patent Laid-Open No. Hei 10-087839 is preferable.

Representative examples of the condensation polymerization resin include polyesters, polyester-polyamides, polyamides, and the like, among which polyesters are preferable. Representative examples of the above-mentioned addition polymerization resin include vinyl resins obtained by a radical polymerization reaction, and other resins.

The amorphous resin has a softening point of preferably from 70° to 180° C. and more preferably from 100° to 160° C., and a glass transition point of preferably from 45° to 80° C. and more preferably from 55° to 75° C. Incidentally, glass transition point is a property intrinsically owned by an amorphous resin, and is distinguished from the maximum peak temperature of heat of fusion.

In the present invention, it is preferable that the amorphous resin is comprised of two different resins of which softening points differ by 10° C. or more, from the viewpoint of low-temperature fixing ability and high-temperature offset resistance. More preferably, the amorphous resin is comprised of a low-softening point resin having a softening point of 70° C. or more and less than 120° C. and a high-softening point resin having a softening point of 120° C. or more and 160° C. or less in a weight ratio (low-softening point resin/high-softening point resin) of preferably from 20/80 to 80/20.

The weight ratio of the crystalline polyester to the amorphous resin (crystalline polyester/amorphous resin) is preferably from 1/99 to 40/60, more preferably from 3/97 to 35/65, and even more preferably from 5/95 to 30/70, from the viewpoint of triboelectric chargeability, storage property, low-temperature fixing ability and durability.

The toner of the present invention may appropriately contain an additive such as a colorant, a charge control agent, a releasing agent, an electric conductivity modifier, an extender, a reinforcing filler such as a fibrous substance, an antioxidant, an anti-aging agent, a fluidity improver, and a cleanability improver.

As the colorant, all of the dyes and pigments which are used as colorants for a toner can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like. These colorants can be used alone or in admixture of two or more kinds. The toner of the present invention can be used as any of black toners, color toners, and full color toners. The content of the colorant is preferably 1 to 40 parts by weight, and more preferably 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quaternary ammonium salt compounds, polyamine resins and imidazole derivatives, and negatively chargeable charge control agents such as metal-containing azo dyes, copper phthalocyanine dyes, metal complexes of alkyl derivatives of salicylic acid and boron complexes of benzilic acid. The content of the charge control agent is preferably 0.1 to 8 parts by weight, and more preferably 0.2 to 7 parts by weight, based on 100 parts by weight of the resin binder.

The toner of the present invention can be used as either one of a positively chargeable toner and a negatively chargeable toner. It is more preferable that the toner of the present invention is used as a positively chargeable toner, since the toner can be suitably used in a high-speed printing machine having an amorphous selenium photoconductor with a linear speed exceeding 370 mm/sec because the toner is so excellent in low-temperature fixing ability and fixed images of steady image quality can be stably provided.

In the case where the toner of the present invention is used as a positively chargeable toner, it is preferable that the toner contains a Nigrosine dye as a positively chargeable charge control agent, from the viewpoint of level of triboelectric charges.

Nigrosine dyes are a black-colored mixture containing a number of components, which are generally obtained by polycondensation between nitrobenzene and aniline in the presence of a metallic catalyst, but the structure thereof has not fully established. Examples of Commercially available Nigrosine dyes including those modified with a resin acid or the like, are "Nigrosine Base EX," "Oil Black BS," "Oil Black SO," "BONTRON N-01," "BONTRON N-04," "BONTRON N-07," "BONTRON N-09," "BONTRON N-11 and "BONTRON N-21" (hereinabove commercially available from Orient Chemical Co., Ltd.); "Nigrosine" (commercially available from Ikeda Kagaku-sha); "Spirit Black No. 850" and "Spirit Black No. 900," (hereinabove commercially available from Sumitomo Chemical Co., Ltd.); and the like.

The content of the Nigrosine dye is preferably 0.2 to 5 parts by weight, and more preferably 0.5 to 4 parts by weight, based on 100 parts by weight of the resin binder.

Further, from the viewpoint of increasing the triboelectric stability, it is preferable that a quaternary ammonium salt compound is used together. The quaternary ammonium salt compound is preferably a compound represented by the formula (I):

wherein each of $R^1$ to $R^4$, which may be identical or different, is a lower alkyl group having 1 to 8 carbon atoms which may be substituted by a halogen atom, an alkyl group or alkenyl group having 8 to 22 carbon atoms, or an aryl group or aralkyl group having 6 to 20 carbon atoms; and $X^-$ is an anion.

In the present invention, from the viewpoint of attaining more stable triboelectric chargeability and more improved fixing ability, it is preferable that each of $R^1$ to $R^4$ is a lower alkyl group having 1 to 4 carbon atoms which may be substituted by a halogen atom, an alkyl group having 12 to 18 carbon atoms, phenyl group or benzyl group, and that $X^-$ is preferably an aromatic sulfonate ion such as toluenesulfonate ion or hydroxynaphthalenesulfonate ion; an aromatic carboxylate ion; molybdate ion; tungstate ion; a halogen ion or hydroxide ion, more preferably the aromatic sulfonate ion, the aromatic carboxylate ion and the molybdate ion.

In the present invention, more preferable is at least one compound selected from the group consisting of a compound represented by the formula (Ia):

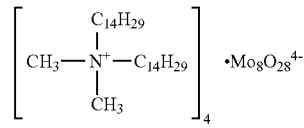

a compound represented by the formula (Ib):

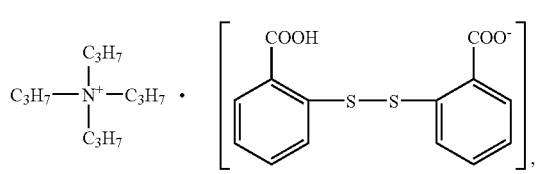

a compound represented by the formula (Ic):

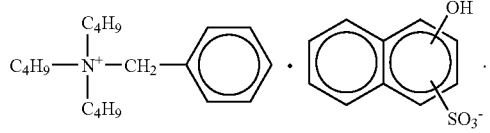

Compounds represented by the formula (Ib) are even more preferable.

Commercially available products containing a compound represented by the formula (Ia) include "TP-415" (commercially available from Hodogaya Chemical Co., Ltd.) and the like, commercially available products containing a compound represented by the formula (Ib) include "COPY CHARGE PSY" (commercially available from Clariant (Japan) K.K.) and the like, and commercially available products containing a compound represented by the formula (Ic) include "BONTRON P-51" (commercially available from Orient Chemical Co., Ltd.) and the like.

The content of the quaternary ammonium salt compound is preferably 0.01 to 5 parts by weight, more preferably 0.05 to 3 parts by weight, and even more preferably 0.1 to 2 parts by weight, based on 100 parts by weight of the resin binder.

In addition, the weight ratio of the quaternary ammonium salt compound to the Nigrosine dye is preferably from 1/100 to 100/100, and more preferably from 10/100 to 70/100.

The releasing agent includes waxes such as natural ester waxes such as carnauba wax and rice wax; synthetic waxes such as polypropylene wax, polyethylene wax and Fischer-Tropsch wax; coal waxes such as montan wax; and alcohol waxes. These waxes may be contained alone or in admixture of two or more kinds. Among them, ester waxes having a melting point of from 60° to 90° C. are preferable from the viewpoint of low-temperature fixing, and it is particularly preferable to use carnauba wax. The content of the wax is preferably 0.1 to 10 parts by weight, and more preferably 0.2 to 9 parts by weight, based on 100 parts by weight of the resin binder.

The toner of the present invention may be prepared by any of conventionally known methods such as a kneading-pulverization method, an emulsion phase-inversion method and a polymerization method, and a pulverized toner obtained by the kneading-pulverizing method is preferable from the viewpoint of easily preparing the toner and markedly exhibiting the effects of the present invention. Incidentally, in the case where a toner is obtained by the kneading-pulverizing method, the toner can be prepared, for example, by homogeneously mixing a resin binder, a colorant, a charge control agent and the like in a mixer such as a Henschel mixer, thereafter melt-kneading with a closed kneader, a single-screw or twin-screw extruder, or the like, cooling, pulverizing, and classifying. In the emulsion phase-inversion method, the toner can be prepared, for example, by dissolving or dispersing a resin binder, a colorant, a charge control agent and the like in an organic solvent, thereafter emulsifying the mixture by adding water, separating the particles, and classifying. The toner has a volume-based median particle size ($D_{50}$) of preferably from 3 to 15 μm. Incidentally, the volume-based median particle size ($D_{50}$) as used herein refers to a particle size at which the cumulative volume frequency based on the particle size from the small particle size side is 50%.

Further, an external additive such as a fluidity improver may be added to the surface of the toner of the present invention by mixing the toner and the external additive under agitation in a high-speed agitator such as a super mixer or a Henschel mixer to allow the external additive to be adhered to the toner surface.

The external additive in the present invention includes inorganic fine particles such as silicone dioxide (silica), titanium dioxide, aluminum oxide, zinc oxide, magnesium oxide, selenium oxide, iron oxide, copper oxide and tin oxide; and the like. Among them, silica and titanium dioxide are preferable, and silica is more preferable, from the viewpoint of imparting triboelectric chargeability. In addition, the inorganic fine particles may be used alone or in admixture of two or more kinds. It is preferable that silica is used in admixture of two or more kinds from the viewpoint of triboelectric stability. It is more preferable that a positively chargeable silica and a negatively chargeable silica are used in combination from the viewpoint of durability in high-speed printing.

In the present invention, the positively chargeable silica is preferably a silica subjected to a hydrophobic treatment with an organopolysiloxane having a nitrogen atom in its side chain.

The organopolysiloxane having a nitrogen atom in its side chain can be obtained by, for example, substituting one or more side chains of the organopolysiloxane with a group having an amino group. The group having an amino group includes, for example, —$R^1$—NH—$R^2$—N($R^3$)$_2$ and —$R^1$—N($R^3$)$_2$, wherein each of $R^1$ and $R^2$ is an alkylene group, preferably an alkylene group having 1 to 10 carbon atoms and more preferably having 1 to 5 carbon atoms, or an arylene group, preferably an arylene group having a total of 6 to 18 carbon atoms and more preferably a phenylene group; and $R^3$ is a hydrogen atom or an alkyl group having 1 to 4 carbon atoms and preferably hydrogen atom.

The organopolysiloxane having a nitrogen atom in its side chain has an amino equivalency of preferably 200 or more, from the viewpoint of enhancing the effect of imparting positively chargeability. Also, the amino equivalency is preferably 22500 or less from the viewpoint of preventing transfer and adhesion of the positively chargeable silica to the carrier. The amino equivalency is more preferably 300 to 10000.

The organopolysiloxane having a nitrogen atom in its side chain has a viscosity at 25° C. of preferably from 10 to 10000 mPa·s, and more preferably from 20 to 3500 mPa·s.

The method of hydrophobic treatment of silica by organopolysiloxane having a nitrogen atom in its side chain is not particularly limited, as long as the organopolysiloxane is adsorbed to the silica surface. The method of hydrophobic treatment is exemplified by a method including spraying a solution prepared by diluting an organopolysiloxane in a solvent to silica in a mixing vessel with agitating, and heating and drying for a given period of time in the vessel with continuously agitating.

In the present invention, the amount of the organopolysiloxane added to the silica is preferably from 1 to 7 mg/m$^2$ per surface area of the silica. The amount of the organopolysiloxane is preferably 1 mg/m$^2$ or more, from the viewpoint of increasing the effect of reducing background fogging. Also, the amount is preferably 7 mg/m$^2$ or less, from the viewpoint of preventing the silica from aggregation and uniformly having the silica adhered to the surface of an untreated toner. The amounts as described above correspond to 5 to 35 parts by weight, per 100 parts by weight of the silica, in a case of a silica having a BET specific surface area of 50 m$^2$/g.

Commercially available positively chargeable silica subjected to a hydrophobic treatment with organopolysiloxane having a nitrogen atom in its side chain includes "HVK-2150" (commercially available from Clariant (Japan) K.K., hydrophobic silica, average particle size: 16 nm), "HDK H3050VP" (commercially available from Clariant (Japan) K.K., hydrophobic silica, average particle size: 10 nm), and the like.

The positively chargeable silica has an average primary particle size of preferably from 5 to 100 nm, and more preferably from 10 to 70 nm.

The content of the positively chargeable silica is preferably 0.05 parts by weight or more, based on 100 parts by weight of a toner without treatment with an external additive (untreated toner), from the viewpoint of chargeability and fluidity. Also, the content is preferably 3 parts by weight or less, from the viewpoint of preventing excessive freeing of the silica. Therefore, the content of the positively chargeable silica is preferably 0.05 to 3 parts by weight, more preferably 0.1 to 2 parts by weight, and even more preferably 0.2 to 0.9 parts by weight, based on 100 parts by weight of the untreated toner.

The negatively chargeable silica includes a silica subjected to hydrophobic treatment with a treating agent such as a silicone oil, dimethyldichlorosilane, or hexamethyldisilazane. In the case where the negatively chargeable silica is used in combination with the positively chargeable silica subjected to hydrophobic treatment with an organopolysiloxane having a nitrogen atom in its side chain, the negatively chargeable silica is preferably a silica subjected to a hydrophobic treatment with a silicone oil from the viewpoint environmental stability.

Commercially available negatively chargeable silica subjected to hydrophobic treatment includes "R972" (commercially available from Nippon Aerosil, average particle size: 16 nm, hydrophobically treated with a treatment agent: dimethyldichlorosilane), "TS720" (commercially available from Cabot Corporation, average particle size: 8 nm, hydrophobically treated with a treatment agent: silicone oil), "NAX50" (commercially available from Nippon Aerosil, average particle size: 30 nm, hydrophobically treated with a treatment agent: hexamethyldisilazane), and the like.

The negatively chargeable silica has an average primary particle size of preferably from 5 to 100 nm, more preferably from 10 to 70 nm, and even more preferably from 10 to 30 nm.

The content of the negatively chargeable silica is preferably 0.05 parts by weight or more, based on 100 parts by weight of a toner without treatment with an external additive (untreated toner), from the viewpoint of chargeability and fluidity. Also, the content is preferably 3 parts by weight or less, from the viewpoint of preventing excessive freeing of the silica. Therefore, the content of the negatively chargeable silica is preferably 0.05 to 3 parts by weight, more preferably 0.1 to 2 parts by weight, and even more preferably 0.2 to 0.9 parts by weight, based on 100 parts by weight of the untreated toner.

It is preferable that the weight ratio of the positively chargeable silica to the negatively chargeable silica (positively chargeable silica/negatively chargeable silica) is preferably 90/10 to 50/50.

The toner containing the crystalline polyester of the present invention not only retains low-temperature fixing ability but also is excellent in both of storage stability and durability which are incompatible with low-temperature fixing ability, due to the crystalline polyester.

The toner of the present invention can be used alone as a developer, in a case where the fine magnetic material powder is contained. Alternatively, the toner can be used as a non-magnetic one-component developer, or the toner can be mixed with a carrier as a two-component developer, in a case where the fine magnetic material powder is not contained. The toner of the present invention is preferably used as a two-component developer since the toner is excellent in durability.

The core material for the carrier includes an iron powder, magnetite, ferrite, and the like. From the viewpoint of image quality, more preferable is ferrite having a low saturation magnetization, thereby causing less contact with the magnetic brush.

It is preferable that the core material has a saturation magnetization of 100 $Am^2/kg$ or less, from the viewpoint of toning and reproducibility of intermediate toning. Also, it is preferable that the core material has a saturation magnetization of 40 $Am^2/kg$ or more, from the viewpoint of carrier adhesion and toner scattering.

In order to further reduce a carrier contamination, it is preferable that the surface of the core material of the carrier is coated with a fluororesin or a silicone coating for a positively chargeable toner, or a silicone resin for a negatively chargeable toner.

The carrier has a volume-average particle size of preferably from 50 to 200 μm. The weight ratio of the toner to the carrier (toner/carrier) in a two-component developer is preferably from 0.5/100 to 8/100.

EXAMPLES

The following examples further describe and demonstrate embodiments of the present invention. The examples are given solely for the purposes of illustration and are not to be construed as limitations of the present invention.

[Softening Point]

The softening point refers to a temperature corresponding to ½ of the height (h) of the S-shaped curve showing the relationship between the downward movement of a plunger and temperature, namely, a temperature at which a half of the resin flows out, when measured by using a flow tester (CAPILLARY PHEOMETER "CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[Maximum Peak Temperature of Heat of Fusion and Glass Transition Temperature]

The maximum peak temperature of heat of fusion is determined using a differential scanning calorimeter (commercially available from Seiko Instruments, Inc., DSC Model 210), by raising its temperature to 200° C., cooling the hot sample from this temperature to 0° C. at a cooling rate of 10° C./min., and thereafter heating the sample so as to raise the temperature at a rate of 10° C./min. In addition, the glass transition temperature refers to the temperature of an intersection of the extension of the baseline of equal to or lower than the maximum peak temperature and the tangential line showing the maximum inclination between the kick-off of the peak and the top of the peak.

[Acid Value]

The acid value is determined by a method according to JIS K 0070.

[Average Molecular Weight of Resin]

A chart showing the molecular weight distribution, as determined by gel permeation chromatography by the method as described below, is obtained. The number-average molecular weight and the weight-average molecular weight are determined from the chart.

(1) Preparation of Sample Solution

A resin is dissolved in chloroform to a concentration of 0.5 g/100 ml. Next, the solution is filtered using a fluororesin filter having a pore size of 2 μm (FP-200, commercially available from Sumitomo Electric Industries, Ltd.), to remove insoluble components to give a sample solution.

(2) Determination of Molecular Weight Distribution

The measurement is taken by passing chloroform as an eluent at a flow rate of 1 ml per minute, stabilizing a column in a thermostat at 40° C., and injecting 100 μl of the sample solution. The molecular weight of the sample is calculated from a calibration curve previously obtained. Here, the calibration curves used are obtained using several types of monodispersed polystyrenes as a standard sample.

Apparatus for Measurement: CO-8010 (commercially available from Tosoh Corporation)

Column for Analysis: GMHLX+G3000HXL (commercially available from Tosoh Corporation)

[Melt Viscosity of Wax]

The melt viscosity is determined using a viscoelastometer "RDA II" (commercially available from Rheometric Scientific F. E. Ltd.) under the following determination conditions.

| | |
|---|---|
| Measurement Jig: | A curette is used. Upper cylinder (radius: 15 mm, length: 32 mm), Lower container (radius: 25 mm), distance between upper cylinder and lower container: 0.5 mm |
| Sample to be Measured: | 8 g |
| Measuring Frequency: | 2 rad/sec |
| Measuring Temperature: | 180° C. |
| Measuring Strain: | 20 points were measured in an automatic measuring mode from 0.5% to 10% in increments of 0.5%. |
| Measured Value: | average value of the 18 measured values excluding the maximum value and the minimum value from the 20 measured values |

Preparation Examples 1 and 2 for Crystalline Polyester

A 5-liter four-necked flask equipped with a nitrogen inlet tube, a dehydration tube, a stirrer and a thermocouple was charged with the raw materials as shown in Table 1, and the raw materials were kept at 140° for 4 hours. The reaction was allowed to proceed, while the temperature was raised from 140° C. to 160° C. at a rate of 10° C./hr, and then from 160° C. to 200° C. at a rate of 20° C./hr. Thereafter, the reaction was carried out at 200° C. under reduced pressure at 8.3 kPa for 4 hours. The values of various physical properties of the resulting resins a and b are shown in Table 1.

Preparation Example 2 for Amorphous Polyester

A 5-liter four-necked flask equipped with a nitrogen inlet tube, a dehydration tube, a stirrer, and a thermocouple was charged with the raw materials as shown in Table 1 except fumaric acid, and the raw materials were reacted at 230° C. for 6 hours. Thereafter, the reaction mixture was cooled to 180° C., and fumaric acid was added. The reaction was allowed to proceed over 4 hours, while temperature was raised from 180° C. to 210° C. at a rate of 10° C./hr, after which the reaction was carried out at 210° C. under reduced pressure at 8.3 kPa until the desired softening point was attained. The values of various physical properties of the resulting resin B are shown in Table 1.

TABLE 1

|  | Crystalline Polyester | | | | Amorphous Polyester | |
| --- | --- | --- | --- | --- | --- | --- |
|  | Resin a | Resin b | Resin c | Resin d | Resin A | Resin B |
| Polypropylene Wax [1] | 470 g | 235 g | — | — | — | — |
| 1,6-Hexanediol | 2384 g | 2384 g | 2384 g | 2336 g | — | — |
| BPA-PO [2] | — | — | — | — | 2450 g | 3087 g |
| BPA-EO [3] | — | — | — | — | 975 g | 59 g |
| Fumaric Acid | 2320 g | 2320 g | 2320 g | 2320 g | — | 298 g |
| Trimellitic Anhydride | — | — | — | — | 278 g | 33 g |
| Dodecenylsuccinic Acid Anhydride | — | — | — | — | 259 g | — |
| Terephthalic Acid | — | — | — | — | 961 g | 994 g |
| Hydroquinone | 2.4 g | 2.4 g | 2.4 g | 2.4 g | — | 4.5 g |
| Dibutyltin Oxide | 12.9 g | 12.9 g | 12.9 g | 12.9 g | 9.8 g | 8.9 g |
| Maximum Peak Temperature (° C.) of Heat of Fusion | 118.5 | 117.2 | 116.8 | 113.5 | — | — |
| Glass Transition Point (° C.) | — | — | — | — | 63.2 | 59.2 |
| Acid Value (mg KOH/g) | — | — | — | — | 6.4 | 10.5 |
| Number-average Molecular Weight | 7500 | 6800 | 6200 | 4000 | 3200 | 2100 |
| Weight-average Molecular Weight | 350000 | 210000 | 530000 | 180000 | 160000 | 12400 |

[1] NP 105: commercially available from MITSUI CHEMICALS, INC., viscosity: 0.15 Pa · s, melting point: 152° C.
[2] Propylene oxide (average number of moles: 2.2) adduct of bisphenol A
[3] Ethylene oxide (average number of moles: 2.2) adduct of bisphenol A

Preparation Examples 3 and 4 for Crystalline Polyester

A 5-liter four-necked flask equipped with a nitrogen inlet tube, a dehydration tube, a stirrer and a thermocouple was charged with the raw materials as shown in Table 1, and the raw materials were kept at 140° for 4 hours. The reaction was allowed to proceed, while the temperature was raised from 140° C. to 160° C. at a rate of 10° C./hr, and then from 160° C. to 200° C. at a rate of 20° C./hr. Thereafter, the reaction was carried out at 200° C. under reduced pressure at 8.3 kPa for 1 hour. The values of various physical properties of the resulting resins c and d are shown in Table 1.

Preparation Example 1 for Amorphous Polyester

A 5-liter four-necked flask equipped with a nitrogen inlet tube, a dehydration tube, a stirrer, and a thermocouple was charged with the raw materials as shown in Table 1, and the raw materials were reacted at 230° C. for 8 hours. Thereafter, the reaction was carried out at 230° C. under reduced pressure at 8.3 kPa until the desired softening point was attained. The values of various physical properties of the resulting resin A are shown in Table 1.

Example 1

The resin binder and the charge control agent as shown in Table 2, 6 parts by weight of a colorant (carbon black) "R330R" (commercially available from Cabot Corporation), 1 part by weight of a releasing agent "Biscol 660P" (commercially available from Sanyo Chemical Industries, Ltd.) and 1.5 parts by weight of a carnauba wax "Carnauba Wax C1" (commercially available from K.K. Kato Yoko) were premixed with a Henschel Mixer. Thereafter, the mixture was melt-kneaded with a twin-screw kneader, cooled and roughly pulverized, and thereafter pulverized with a jet mill and classified, to give a powder having a volume-average particle size ($D_{50}$) of 10 μm. To 100 parts by weight of the resulting powder, 0.4 parts by weight of a positively chargeable hydrophobic silica "HDK 3050 VP" (commercially available from Clariant (Japan) K.K., average particle size: 10 nm) and 0.1 parts by weight of a negatively chargeable hydrophobic silica "TS 720" (commercially available from Cabot Corporation, average particle size: 8 nm) were added as external additives, and the ingredients were mixed in a Henschel Mixer, to give a toner.

Thirty-nine parts by weight of the toner and 1261 parts by weight of a ferrite carrier coated with a fluororesin/acrylic resin and having a saturation magnetization of 60 Am²/kg (average particle size: 110 μm) were mixed with a Nauta Mixer, to give a two-component developer.

Examples 2 to 8 and Comparative Examples 1 to 3

The same procedures were carried out as in Example 1 except that 0.3 parts by weight of a positively chargeable hydrophobic silica "HVK 2150") (commercially available from Clariant (Japan) K.K., average particle size: 16 nm) were used as an external additive, to give a toner and a two-component developer.

Test Example 1 Confirmation of Ghost Phenomenon

A developer was loaded in a contact development device "Infoprint 4000 IS1" (commercially available from IBM Japan, Ltd., linear speed: 1066 mm/sec, resolution: 240 dpi, development system: 3 magnet rollers and selenium photoconductor, reversal development). The image density was adjusted to 2.0 by the contrast level, thereafter a 2000000-sheet continuous printing of a printing pattern including a 0.3 mm-wide line in the rotational direction of the photoconductor at a blackened ratio of 4% was carried out using a continuous feeding paper of 11×18 inches and 65 g/cm².

In the continuous printing, after printing of the first 1000000 sheets, a 3000000-sheet continuous printing of a blank page (printing pattern having no image) was carried out using the same continuous feeding paper as above, and whether a toner was developed on a non-image bearing portion was visually determined. Similarly, after printing of 1500000 sheets, 2000000 sheets and 3000000 sheets, a continuous printing of a blank page was carried out as in the case of printing of the first 1000000 sheets, and whether a toner was developed on a non-image bearing portion was visually determined. The results are shown in Table 2. Incidentally, although the printable limit for the printer used was 1000000 sheets, up to 3000000 copies were printed in this test to confirm if a ghost phenomenon occurred. In this test, when there is no ghost phenomenon at the time of printing the 1000000th copy, the toner is considered allowable.

Test Example 2 Test on Fixing Ability

A developer is loaded in the "Infoprint 4000 IS1" used in Test Example 1, the preheat level is set to "10," and the printer is turned off. After leaving the printer for 30 minutes, the printer is turned on again, and a 200-sheet printing of a blank page (printing pattern having no image) is carried out using a continuous feeding paper of 11×18 inches and 65 g/cm².

Subsequently, the image density was adjusted so as to be 1.8 by the contrast level. Thereafter, a 30-sheet continuous printing of a printing pattern having a solid portion of 2.5 square centimeters on the back end side of the sheet and 8% blackened ratio was carried out using a continuous feeding paper of 11×18 inches and 209 g/cm².

Next, the preheat level was set to "20" and a 200-sheet printing of a blank page was carried out. Thereafter, the image density was adjusted by the contrast in the same manner as in the preheat level of "10," and a printing pattern having a solid portion of 2.5 square centimeters at the back end side of a sheet at a blackened ratio of 8% was printed.

Subsequently, the preheat level was changed to "30," and a printing pattern was printed in the same manner as in the preheat level of "20."

Incidentally, the actual determination temperatures were 50° C., 61° C. and 67° C., for the preheat levels "10," "20" and "30," respectively.

The image density of the solid portion in the printed sheets obtained as above was determined using a "Gretag SPM 50" (commercially available from GretagMacbet, absolute white calibration; Pol filter, observation field: 2° C., illumination type: +; Wbase: Abs; Dstd: DIN NB, Sample Mode). The printed sheet was set on a rubbing test machine provided with a metal blade. The surface to be contacted with the printed sheet was surrounded with a white sheet of 65 g/cm², and the solid portion was rubbed backward and forward 10 times with the blade applied to a load of 1 kg. The image density was again measured after rubbing, and the residual ratio after rubbing was determined by the following equation. The results are shown in Table 2.

Residual Ratio (%) after Rubbing=(Image Density after Rubbing/Image Density before Rubbing)×100

TABLE 2

| | Resin Binder | | | | | | Charge | | Ghost Phenomenon | | | | Fixing Ability (Residual Ratio (%) after Rubbing) | | |
|---|---|---|---|---|---|---|---|---|---|---|---|---|---|---|---|
| | Crystalline Polyester | | | | Amorphous Polyester | | Control Agent [1)] | | 1000000 | 1500000 | 2000000 | 3000000 | Preheat Settings | | |
| | Resin a | Resin b | Resin c | Resin d | Resin A | Resin B | N-04 | PSY | sheets | sheets | sheets | sheets | 10 | 20 | 30 |
| Ex. 1 | 20 | — | — | — | 60 | 20 | 2.0 | 0 | none | none | none | none | 92.7 | 94.5 | 99.8 |
| Ex. 2 | 20 | — | — | — | 60 | 20 | 2.0 | 0 | none | none | none | occurred | 92.5 | 94.2 | 95.4 |
| Ex. 3 | 7.5 | — | — | — | 60 | 32.5 | 2.0 | 0 | none | none | none | occurred | 83.3 | 85.4 | 89.9 |
| Ex. 4 | 20 | — | — | — | 60 | 20 | 2.0 | 0.2 | none | none | occurred | occurred | 93.5 | 98.0 | 97.6 |
| Ex. 5 | — | 20 | — | — | 60 | 20 | 2.0 | 0.2 | none | none | occurred | occurred | 90.4 | 94.9 | 96.1 |
| Ex. 6 | 20 | — | — | — | 60 | 20 | 4.0 | 0 | none | none | none | occurred | 90.7 | 91.8 | 94.1 |
| Ex. 7 | 20 | — | — | — | 60 | 20 | 4.0 | 0.2 | none | none | occurred | occurred | 90.3 | 91.2 | 93.9 |
| Ex. 8 | 20 | — | — | — | 60 | 20 | 0 | 0.2 | none | occurred | occurred | occurred | 94.0 | 98.4 | 98.0 |
| Comp. Ex. 1 | — | — | 20 | — | 60 | 20 | 2.0 | 0.2 | occurred | occurred | occurred | occurred | 88.4 | 90.5 | 93.7 |

TABLE 2-continued

| | Resin Binder | | | | | | | | Ghost Phenomenon | | | | Fixing Ability (Residual Ratio (%) after Rubbing) | | |
|---|---|---|---|---|---|---|---|---|---|---|---|---|---|---|---|
| | Crystalline Polyester | | | | Amorphous Polyester | | Charge Control Agent [1] | | | | | | Preheat Settings | | |
| | Resin a | Resin b | Resin c | Resin d | Resin A | Resin B | N-04 | PSY | 1000000 sheets | 1500000 sheets | 2000000 sheets | 3000000 sheets | 10 | 20 | 30 |
| Comp. Ex. 2 | — | — | — | 20 | 60 | 20 | 2.0 | 0.2 | occurred | occurred | occurred | occurred | 89.3 | 92.3 | 94.7 |
| Comp. Ex. 3 | — | — | — | — | 60 | 40 | 2.0 | 0.2 | none | none | none | none | 52.9 | 73.0 | 78.4 |

Note)
The amounts of the resin binder and the charge control agent used are expressed in parts by weight.
[1] N-04 (BONTRON N-04): commercially available from Orient Chemical Co., Ltd., positively chargeable charge control agent
PSY (COPY CHARGE PSY): commercially available from Clariant (Japan) K.K., positively chargeable charge control agent It can be seen from the above results that the toners of Examples 2 to 8 did not cause a ghost phenomenon, which was a problem inherent in crystal polyesters, when examined after printing 1000000 copies, the target sheet number for continuous printing without ghost phenomenon, while the low-temperature fixing ability was retained. Further, in the toner of Example 1 containing both of a positively chargeable silica and a negatively chargeable silica, it can be seen that no ghost phenomenon occurred even after printing 3000000 copies and therefore the toner is highly suitable for high-speed printing for long period of time.

By contrast, in the toners of Comparative Examples 1 and 2 containing a crystalline polyester without wax, a ghost phenomenon occurred, thought the low-temperature fixing ability was satisfactory. On the other hand, the result for the toner of Comparative Example 3 containing an amorphous polyester alone is that the fixing ability was poor, though no ghost phenomenon occurred.

The toner containing the crystalline polyester of the present invention can be used, for example, for developing electrostatic latent images formed in electrophotography, electrostatic recording method, electrostatic printing method, and the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A toner comprising as a resin binder, a crystalline polyester and at least one amorphous resin, wherein the amorphous resin comprises an amorphous polyester, wherein the crystalline polyester is obtained by a process comprising polymerizing raw material monomers in the presence of a wax, and wherein the crystalline polyester has a number-average molecular weight of from 3000 to 10000 and a weight-average molecular weight of from 150000 to 530000.

2. The toner according to claim 1, wherein the amorphous polyester comprises two different amorphous polyesters of which softening points differ by 10° C. or more.

3. The toner according to claim 2, wherein one of the amorphous polyesters is a low-softening point resin having a softening point of from 70° C. to less than 120° C., and the other amorphous polyester is a high-softening point resin having a softening point of from 120° C. to 160° C.

4. The toner according to claim 3, wherein the low-softening point resin and the high-softening point resin are present in a weight ratio of 20/80 to 80/20.

5. The toner according to claim 1, wherein the weight ratio of the crystalline polyester to the amorphous resin is from 1/99 to 40/60.

6. The toner according to claim 1, further comprising a Nigrosine dye.

7. The toner according to claim 1, further comprising as a releasing agent an ester wax having a melting point of from 60° to 90° C.

8. The toner according to claim 1, further comprising as an external additive a positively chargeable silica and a negatively chargeable silica.

9. The toner according to claim 1, wherein the toner is used in combination with a carrier having a saturation magnetization of from 40 to 100 Am$^2$/kg.

10. A two-component developer comprising the toner as defined in claim 1 and a carrier having a saturation magnetization of from 40 to 100 Am$^2$/kg.

11. The toner according to claim 1, wherein the wax is a hydrocarbon-based wax.

12. The toner according to claim 11, wherein the hydrocarbon-based wax is a polyethylene wax or a polypropylene wax.

13. The toner according to claim 11, wherein the wax is a polypropylene wax.

14. The toner according to claim 13, wherein the polypropylene wax has a melting point of 152° C.

15. The toner according to claim 1, wherein the wax has a melt viscosity at 180° C. of from 0.03 to 0.2 Pa·s.

16. The toner according to claim 1, wherein the wax is contained in an amount of 0.1 to 20 parts by weight based on 100 parts by weight of the crystalline polyester.

17. The toner according to claim 1, wherein the crystalline polyester is obtained by polycondensation of an alcohol component comprising 60% by mol or more of an aliphatic diol having 2 to 6 carbon atoms, and a carboxylic acid component comprising 60% by mol or more of an aliphatic dicarboxylic acid compound having 2 to 8 carbon atoms.

18. The toner according to claim 17, wherein the molar ratio of the carboxylic acid component to the alcohol component in the crystalline polyester is 0.9 or more and less than 1.0.

19. The toner according to claim 1, wherein the crystalline polyester comprises 1 to 40% by weight of the resin binder.

20. The toner according to claim 1, wherein the amorphous polyester has a softening point of from 100° to 160° C.

21. The toner according to claim 1, wherein the amorphous polyester has a glass transition point of from 55° to 75° C.

* * * * *